(12) United States Patent
Newton et al.

(10) Patent No.: US 7,751,671 B1
(45) Date of Patent: Jul. 6, 2010

(54) OPTICAL TOUCHSCREENS COMPRISING REMOVABLY CONNECTED OPTICAL MEMBERS

(75) Inventors: John David Newton, Auckland (NZ); Simon James Bridger, Auckland (NZ)

(73) Assignee: Next Holdings Limited (NZ)

( * ) Notice: Subject to any disclaimer, the term of this patent is extended or adjusted under 35 U.S.C. 154(b) by 0 days.

(21) Appl. No.: 12/643,234

(22) Filed: Dec. 21, 2009

(30) Foreign Application Priority Data

Mar. 25, 2009 (AU) .............................. 2009901278

(51) Int. Cl.
*G02B 6/00* (2006.01)
*G06F 3/041* (2006.01)
*G06F 3/042* (2006.01)

(52) U.S. Cl. ................. 385/134; 385/136; 385/147; 385/901; 345/173; 345/175

(58) Field of Classification Search ........... 385/134, 385/136, 147, 901; 345/173, 175
See application file for complete search history.

(56) References Cited

U.S. PATENT DOCUMENTS

| 5,233,502 | A | 8/1993 | Beatty et al. | |
|---|---|---|---|---|
| 6,031,524 | A | 2/2000 | Kunert | |
| 6,909,425 | B2 | 6/2005 | Matsuda et al. | |
| 7,230,608 | B2 | 6/2007 | Cok | |
| 7,432,914 | B2 * | 10/2008 | Kobayashi et al. | .......... 345/173 |
| 7,492,357 | B2 * | 2/2009 | Morrison et al. | ............ 345/173 |
| 7,499,037 | B2 | 3/2009 | Lube | |
| 7,515,138 | B2 | 4/2009 | Sullivan | |
| 7,515,141 | B2 * | 4/2009 | Kobayashi | ................... 345/173 |
| 2001/0022579 | A1 * | 9/2001 | Hirabayashi | ................ 345/175 |
| 2003/0147016 | A1 | 8/2003 | Lin et al. | |
| 2004/0125086 | A1 | 7/2004 | Hagermoser et al. | |
| 2005/0200612 | A1 * | 9/2005 | Tanaka et al. | ............... 345/175 |
| 2007/0059520 | A1 | 3/2007 | Hatin et al. | |
| 2007/0215451 | A1 | 9/2007 | Sasloff et al. | |
| 2008/0062149 | A1 * | 3/2008 | Baruk | ........................ 345/175 |
| 2009/0213094 | A1 * | 8/2009 | Bridger | ...................... 345/175 |

FOREIGN PATENT DOCUMENTS

EP 0181196 5/1986

* cited by examiner

*Primary Examiner*—Ryan Lepisto
(74) *Attorney, Agent, or Firm*—Kilpatrick Stockton LLP

(57) ABSTRACT

A mounting assembly for mounting an optical member to a panel can comprise a mounting portion configured to contact a top surface of the panel when mounted to the panel and a receiving portion to receive optical hardware such as an optical detector so that a field of view of the optical detector substantially encompasses the top surface of the panel when the mounting assembly is mounted thereto. The assembly can include an attachment member to attach the mounting portion to the panel and to limit axial movement along or about an axis parallel to an edge of the panel when the mounting assembly is mounted to the panel. The body of the mounting portion may also be shaped to limit axial movement, such as by including a lip in contact with edges of the panel and/or a base portion that contacts the top surface of the panel when mounted.

14 Claims, 8 Drawing Sheets

OPTICAL TOUCHSCREENS COMPRISING REMOVABLY CONNECTED OPTICAL MEMBERS

PRIORITY CLAIM

This application claims priority to Australian provisional application 2009901278, filed Mar. 25, 2009, which is incorporated by reference herein in its entirety.

BACKGROUND

Touch-enabled displays and other devices that rely on detection of a position of one or more objects (such as a stylus, a finger or fingers) relative to a panel have become increasingly popular. For example, one type of touch-enabled display features one or more image sensors used to determine the position of an object (or objects) relative to the display area. A computer or display manufacturer may rely on an outside vendor to build and/or design the image sensors and other hardware (generally "optical hardware").

For instance, computer/display manufacturers may rely on a vendor to provide panels with cameras or other optical hardware pre-mounted in a precise location. This practice has introduced complications and delay in the manufacturing process. For example, if a panel is damaged, the panel and the relatively expensive hardware are usually both discarded. If the panel and optical hardware are provided separately, mounting the hardware may take time and require relatively skilled workers and/or complex tools that are uneconomical for the computer/display manufacturer to deploy.

SUMMARY

Embodiments configured in accordance with one or more aspects of the present subject matter can avoid difficulty in handling whole panels and integrating panels with pre-mounted imaging cameras into a manufacturing process. In accordance with one or more aspects of the present subject matter, a removably connected optical member can be used with a mounting assembly configured to facilitate quick and easy mounting of the optical member to a panel. This can, for example, allow a manufacturer to source panels independent of optical hardware while avoiding the cost and complexity of positioning optical hardware permanently and directly on the panel.

As an example, a mounting assembly for mounting an optical member to a panel can comprise a mounting portion configured to contact a top surface of the panel when the mounting assembly is mounted to the panel, an optical member receiving portion comprising an opening to receive optical hardware such as an optical detector. The optical member receiving portion can be configured to position the optical member so that a field of view of the optical detector substantially encompasses the top surface of the panel when the mounting assembly is mounted thereto. The assembly can also include an attachment member configured to attach the mounting portion to the panel and to limit axial movement of the mounting portion along or about an axis parallel to an edge of the panel when the mounting assembly is mounted to the panel. The body of the mounting portion may also be shaped to limit axial movement, such as by including a lip in contact with edges of the panel and/or a base portion that contacts the top surface of the panel when mounted.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Reference will now be made in detail to various and alternative exemplary embodiments and to the accompanying drawings. Each example is provided by way of explanation, and not as a limitation. It will be apparent to those skilled in the art that modifications and variations can be made. For instance, features illustrated or described as part of one embodiment may be used on another embodiment to yield a still further embodiment. Thus, it is intended that this disclosure includes modifications and variations as come within the scope of the appended claims and their equivalents.

In the following detailed description, numerous specific details are set forth to provide a thorough understanding of the claimed subject matter. However, it will be understood by those skilled in the art that claimed subject matter may be practiced without these specific details. In other instances, methods, apparatuses or systems that would be known by one of ordinary skill have not been described in detail so as not to obscure the claimed subject matter.

Figure 1:
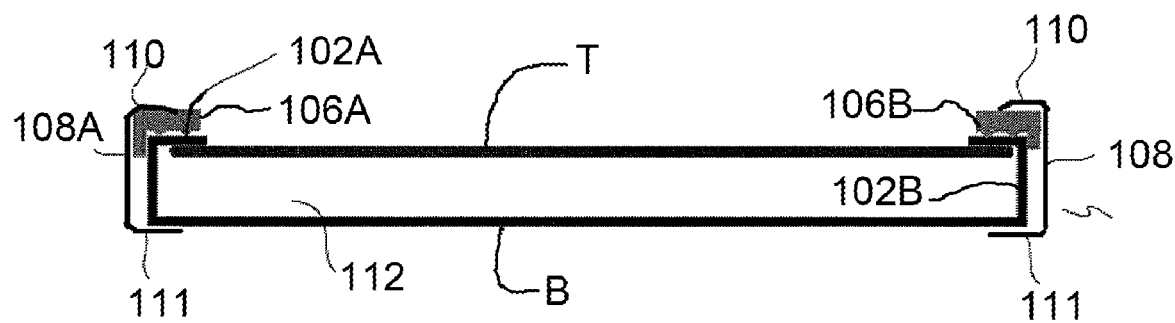
FIG. 1 is a cross-sectional view showing an embodiment of a mounting assembly as mounted to a panel.

FIG. 1 is a side view showing an embodiment of a mounting assembly as mounted to a panel. In this example, a mounting assembly for mounting an optical member to a panel comprises a mounting portion 102 configured to contact a top surface T of the panel 112 when the mounting assembly is mounted to the panel. An optical member receiving portion includes an opening to receive an optical member 106, the optical member comprising at least an optical detector. The optical member receiving portion is configured to position the optical member so that a field of view of the optical detector substantially encompasses the top surface of the panel when the mounting assembly is mounted thereto.

An attachment member 108 is configured to attach the mounting portion to the panel and to limit axial movement of the mounting portion along or about an axis parallel to an edge of the panel when the mounting assembly is mounted to the panel. The attachment member may also limit motion in an axis perpendicular to the panel's surface. In this example, each attachment member 108 includes a joining portion that extends between a top portion 110 and a bottom portion 111. The top and bottom portions can apply pressure to secure mounting portion 102 to panel 112—for instance, top portion 110 can apply downward pressure towards top T, while bottom portion 111 can apply upward pressure towards bottom B to hold panel 112 in engagement with mounting portion 102. As will be discussed below, in some embodiments an attachment member 108 can comprise one or more clips.

Panel 112 may, for example, comprise a display device or an at least partially transparent material overlaid on a display device. However, the present subject matter can be utilized in constructing other touch-enabled panels, e.g., a transparent or opaque surface used as a trackpad or other input device. As will be discussed below, by configuring the mounting assembly to limit axial movement and to otherwise properly position the optical member, a touch-enabled panel can be assembled easily by relatively unskilled laborers and/or by machine without requiring precise adjustment of the optical member position. These principles can be applied regardless of the relative size of panel 112, mounting assemblies 102 and related components, and/or the size of optical assemblies 106 or other optical hardware. However, in some embodiments, portions of the mounting assemblies in contact with the panel 112 are less than the entire area of the panel 112 and do not extend across the width or height of the panel.

In some embodiments, panel 112 may comprise a bezel surrounding the main body of the display surface or material above the display surface at its edges. Reference to a mounting assembly mounted on or in contact with the panel is meant to include embodiments that use a bezel. For example, a mounting assembly may be partially or completely in contact with the bezel rather than the main body of the display or material over the display. If the bezel extends around the edges of the display/material over the display, the mounting assembly may be in contact with the bezel rather than the edges of the display/material.

In this example, two mounting assemblies 102A and 102B are shown, along with respective optical members 106A and 106B, attachment members 108A and 108B, and other components. However, the present subject matter can be used to mount a single optical member or more than two optical members, either in separate mounting assemblies or together.

Figure 2:
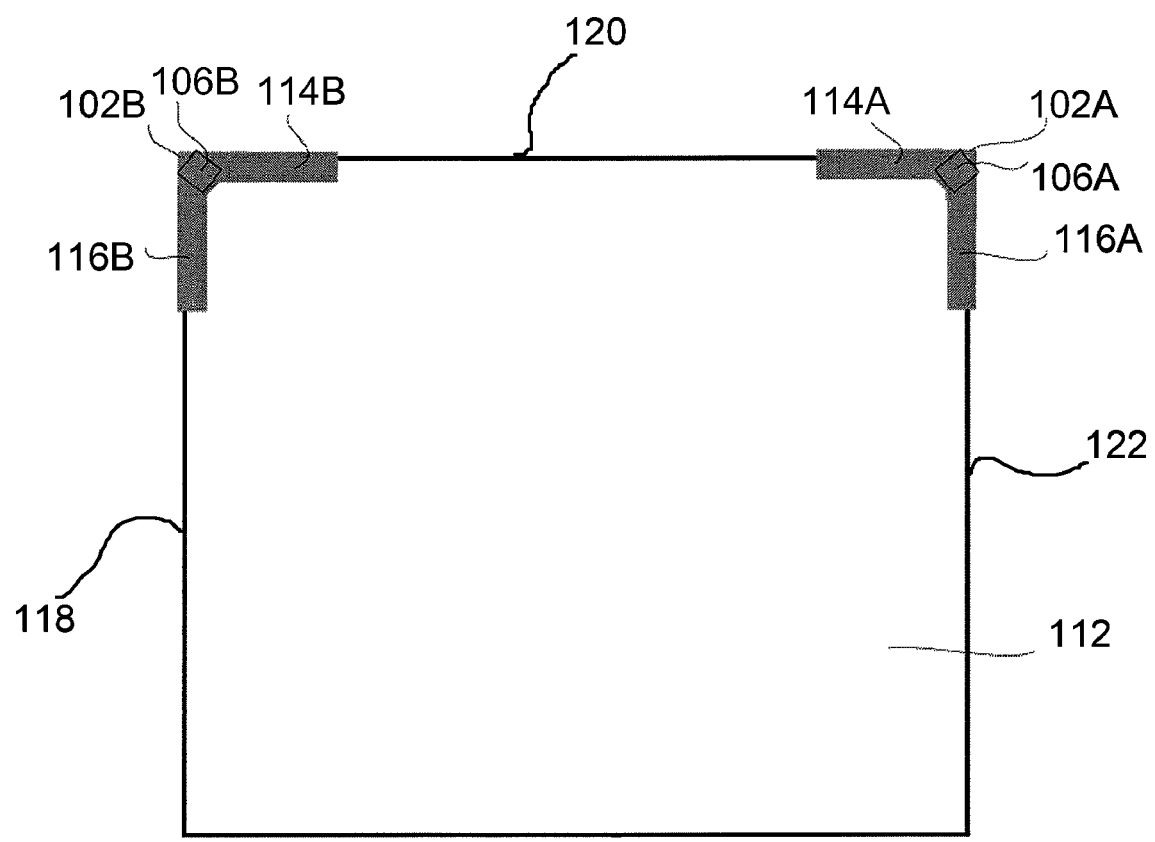
FIG. 2 is a top view of the mounting assembly shown in FIG. 1.

FIG. 2 is a top view of the mounting assemblies shown in FIG. 1. Each mounting portion 102 comprises a first extension 114 extending therefrom in a first direction and a second extension 116 extending therefrom in a second direction. In this example, the first direction and the second direction are substantially perpendicular to each other—extensions 114A and 114B extend along the x-axis (horizontally in the page) and extensions 116A and 116B extend along the y-axis (vertically in the page).

The first extension 114 of each mounting portion contacts the top surface of the panel along a first edge and the second extension 116 contacts the top surface of the panel along a second edge when the mounting assembly is mounted thereto. In this example, extension 114A contacts the top surface T along edge 120, extension 116A contacts the top surface T along edge 122, extension 114B contacts the top surface T along edge 120, and extension 116B contacts the top edge T along edge 118.

Additionally, as can be seen from the position of optical members 106A and 106B, the optical member receiving portion is mounted to each respective mounting portion 102A, 102B substantially between the first extension and the second extension. Thus, when the mounting portions 102 are positioned along perpendicular edges of panel 104, optical members 106 are positioned approximately at the location of corners (if any) of panel 104. Panel 104 may or may not have square corners and may not have any corners. For example, in some embodiments the corners are beveled, rounded, or otherwise shaped. Mounting assembly 102 can be appropriately configured to seat partially or fully on the corner, beveled edge, or other shaping as the case may be.

Figure 3:
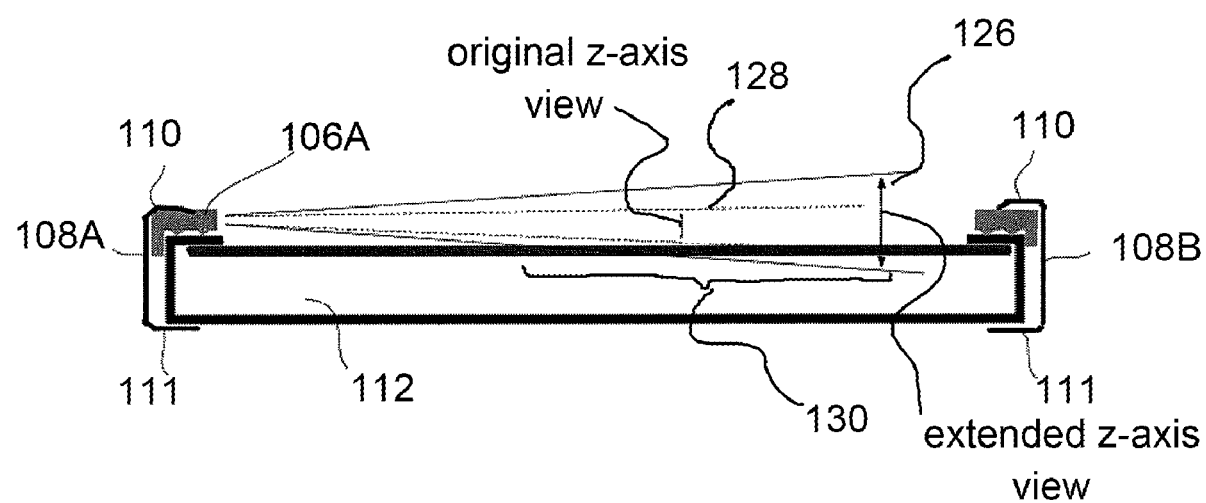
FIG. 3 is another cross-sectional view of the mounting assembly shown in FIG. 1.

FIG. 3 is another cross-sectional view of the mounting assembly of FIG. 1. In this example, an extended z-axis view is shown at 126, along with an original z-axis view at 128. Extended z-axis view 126 results from the use of mounting assemblies such as 102 that allow an optical member to be positioned slightly higher (in the z-axis) than would be possible were the same optical assembly positioned directly on a panel. The z-axis height can be adjusted through the shape and position of a recess (shown in FIGS. 4A-B) which receives the optical member. FIG. 3 also shows at 130 that optical member 106A can image a substantial portion of the panel area. As used herein, a "substantial portion" is meant to include at least one third of the total area of the top surface T of the panel.

Optical member 106 can comprise any type or arrangement of optical components used in touch and/or position detection. For example, in some embodiments, optical member 106 comprises a line or area sensor used to identify a position of an object. In some embodiments, the optical member further comprises at least one optical emitter configured to emit energy across the top surface of the panel when the mounting assembly is mounted thereto. For example, an infrared lighting assembly can be used to direct light across the top surface of the panel to a retroreflective border, with a line or area sensor used to determine a position of an object based on detecting a shadow corresponding to an interruption of the directed and/or retroreflected light. As another example, light may be reflected from the object directly into the sensor.

Figure 4A:
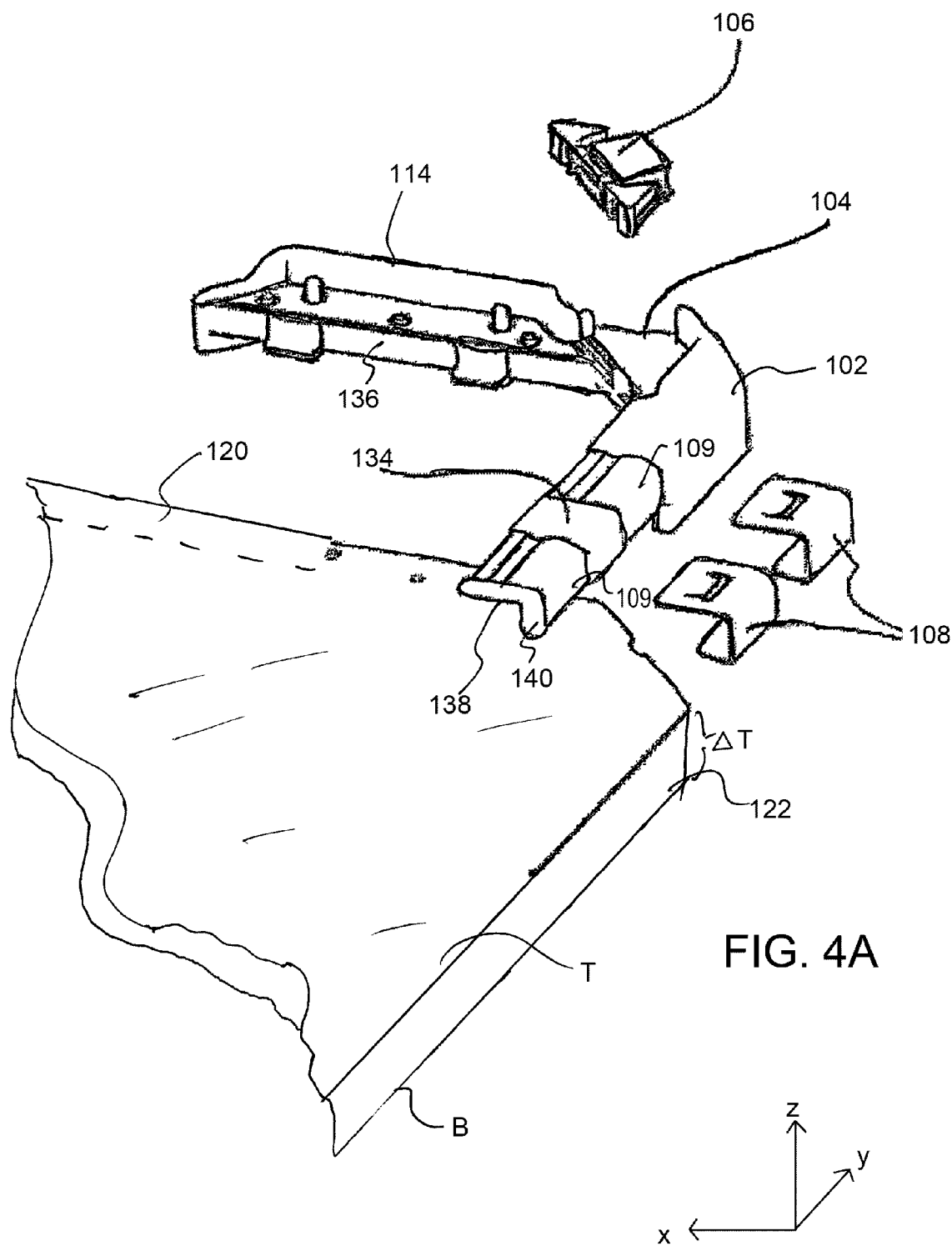
FIGS. 4A and 4B are each a perspective view of a mounting assembly.
Figure 4B:
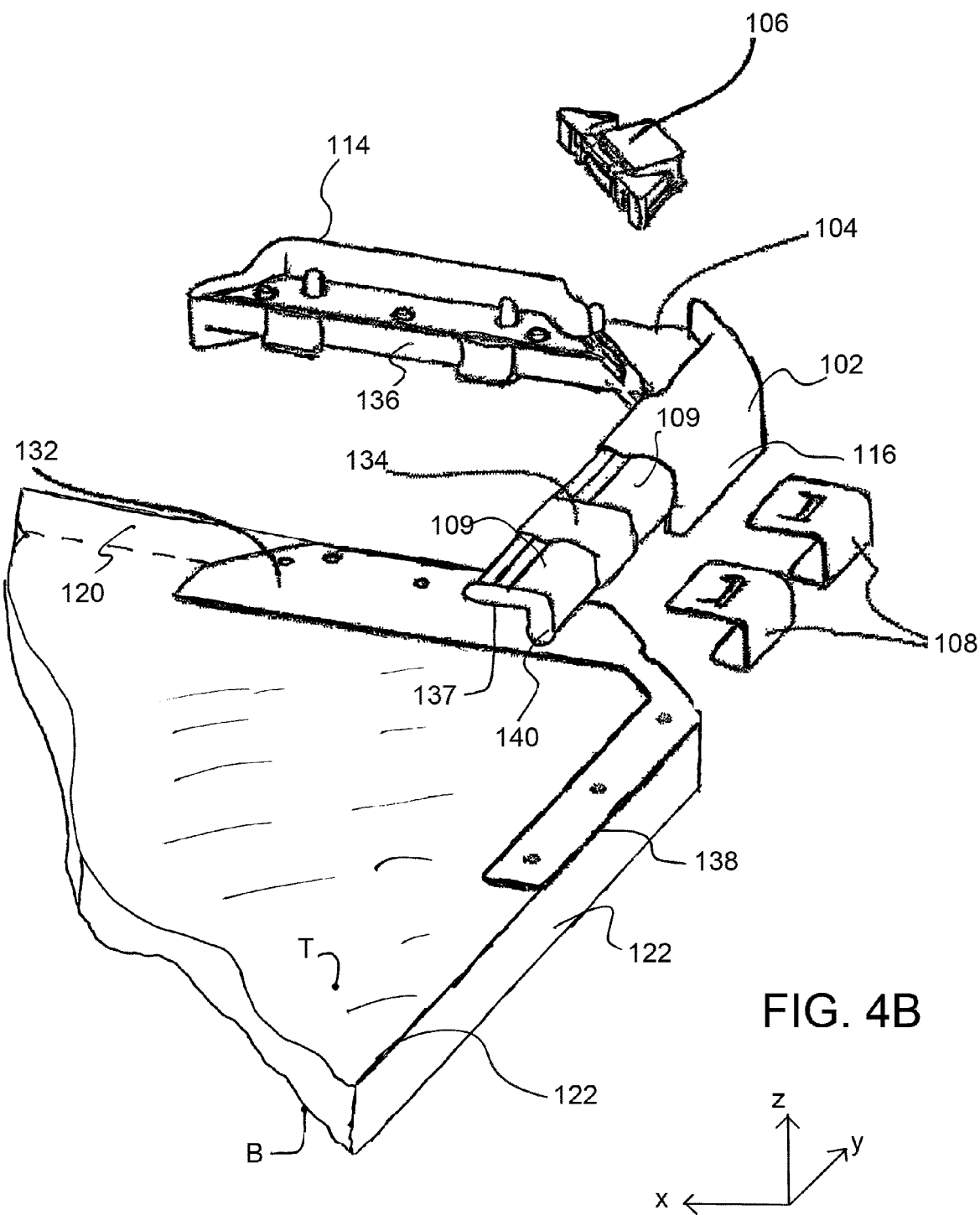

FIGS. 4A and 4B are each a perspective view of a mounting assembly in closer detail. It will be understood that the particular features shown in these views are for purposes of example only and that the relative length, shape, and other features depicted in FIGS. 4A-4B are not meant to be limiting. In these examples, a partial view of panel 112 is shown, with edges 120 and 122 visible along with top surface T and bottom surface B. As can be seen, the top and bottom surfaces are separated by a thickness ΔT at the edges. Top surface T and bottom surface B are substantially planar, with edges of the panel substantially perpendicular to the planes of the top and bottom surfaces, with substantially in this context referring to acceptable manufacturing tolerances, and allowing for presence of a bezel that extends slightly above the plane of the majority of the panel area. If a bezel is present, the top of the bezel will correspond to top surface T at the mounting positions and should be parallel to the top surface T of the rest of the panel. If the bezel extends around the edges, then the panel edges will correspond to the bezel edges.

In FIG. 4A, the mounting assembly is shown as main body 102 having a first extension member 114 and a second extension member 116 as noted above, with the first and second extension members substantially perpendicular to one another in a plane defined by a first axis and a second axis. In this example, the first axis is the x-axis and the second axis is the y-axis. The first and second extension members are joined by a connecting member which features a recess 104 adapted to receive an optical member 106. For example, recess 104 can be shaped so that optical member 106 fits closely or even snaps into place, such as by forming the recess in shape and dimension to fit a circuit board or housing comprising optical member 106.

Each of the first and second extension members defines an outer surface 134 (best visible on second extension member 116), which is opposite a bottom surface 136 (best visible on first extension member 114). The bottom surface 136 in this example defines a first portion substantially parallel to the plane defined by the first and second axes (the X-Y plane in this example). A lip portion 140 protrudes from the bottom surface 136 in a direction substantially perpendicular to the plane. In this example, the first portion corresponds to a contact surface 138.

As was noted above, recess 104 is formed so that, when the connecting member is positioned at a corner area of a panel with the contact surface in contact with a top surface of the panel (and/or bezel, if the panel comprises a bezel), the optical component is positioned at or near the top surface of the panel. The lip portion 140 of first extension member 114 extends along the first axis and the lip portion of the second extension member 116 extends along the second axis.

Lip portion 140 contacts the edges of the panel (or bezel, if present). For instance, in FIG. 4A, main body 102 can be moved downward (z-minus direction) until contact portion 138 touches top T, while the lip portions of first member 114 and second member 116 are in contact with edges 120 and 122, respectively.

Figure 4C:
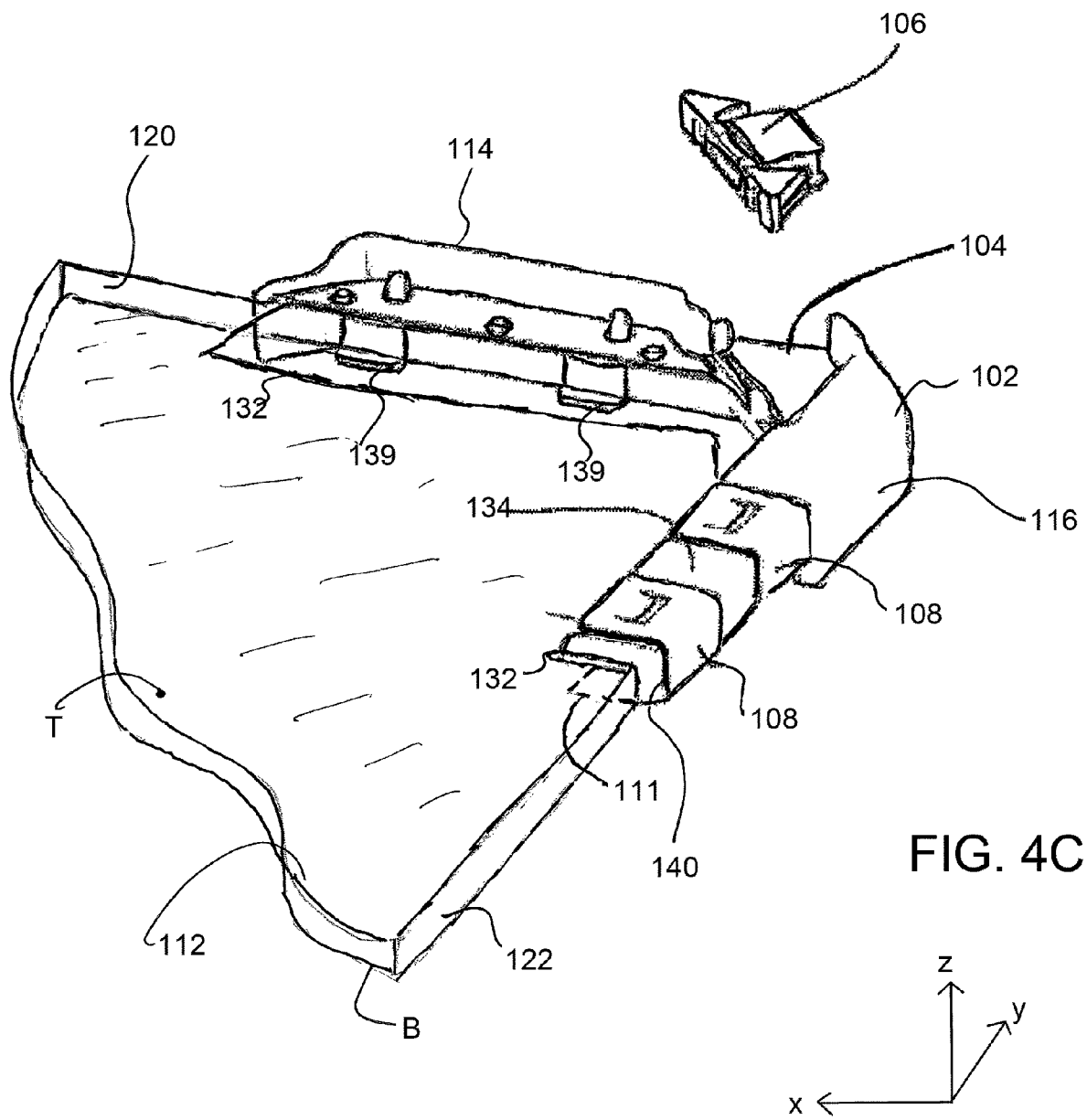
FIG. 4C shows the assembly of FIG. 4B as mounted to a panel.

FIG. 4B illustrates a similar arrangement to FIG. 4A, but in this example the mounting portion includes a base portion 132. Base portion 132 is shown in position on panel 112, but in practice can be integrated with the body of mounting assembly 102. For example, base 132 can provide holes or other features to interlock with corresponding protrusions on members 114 and 116. In this example, contact surface 138 of the mounting assembly is defined by the bottom side of mounting base 132, the top side of which is in contact with the first portion of bottom surface 136 of main body 102 as shown at 137. FIG. 4C provides an example of the assembly of FIG. 4B in place on a panel. In this view, the bottom member 111 of a clip 108 is visible in dashed lines and shown in contact with bottom surface B. Base portion 132 makes contact with top surface T and lip portion 140 contacts the edges. Additionally, in this view, a retaining portion 139 of member 114 can be seen in contact with bottom surface B along edge 120. Use of the retaining portion 139 may further enhance the positioning and grip of the mounting assembly even if clips are not used (as is the case in this example).

Figure 5A:
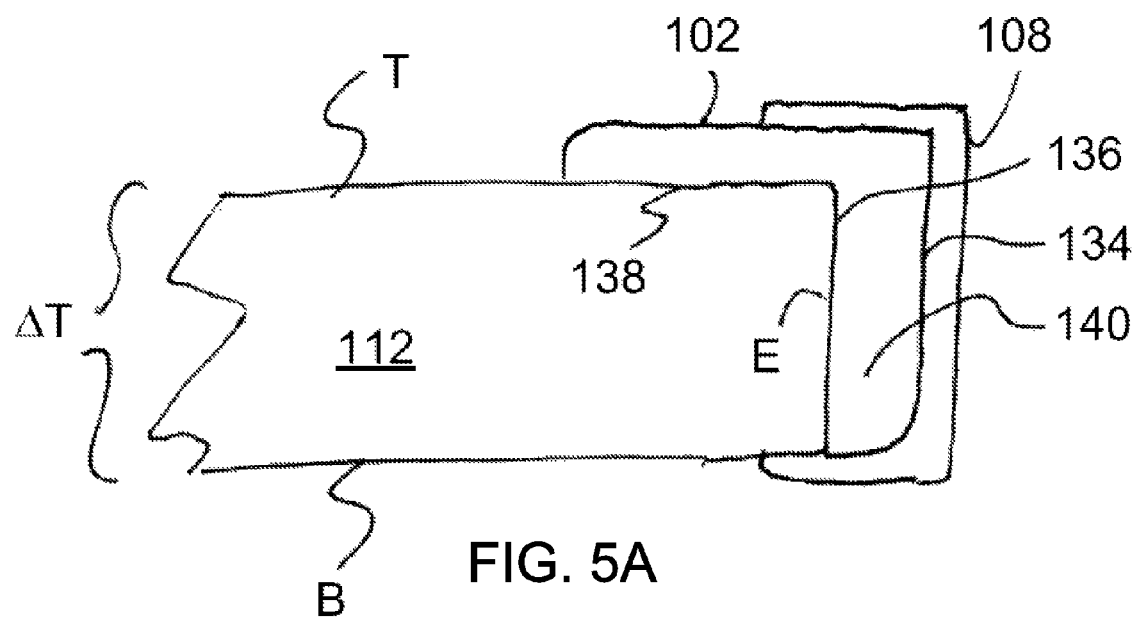
FIGS. 5A and 5B are each a cross-sectional view of the mounting assembly shown in FIGS. 4A-4B as mounted to a panel in closer detail.
Figure 5B:
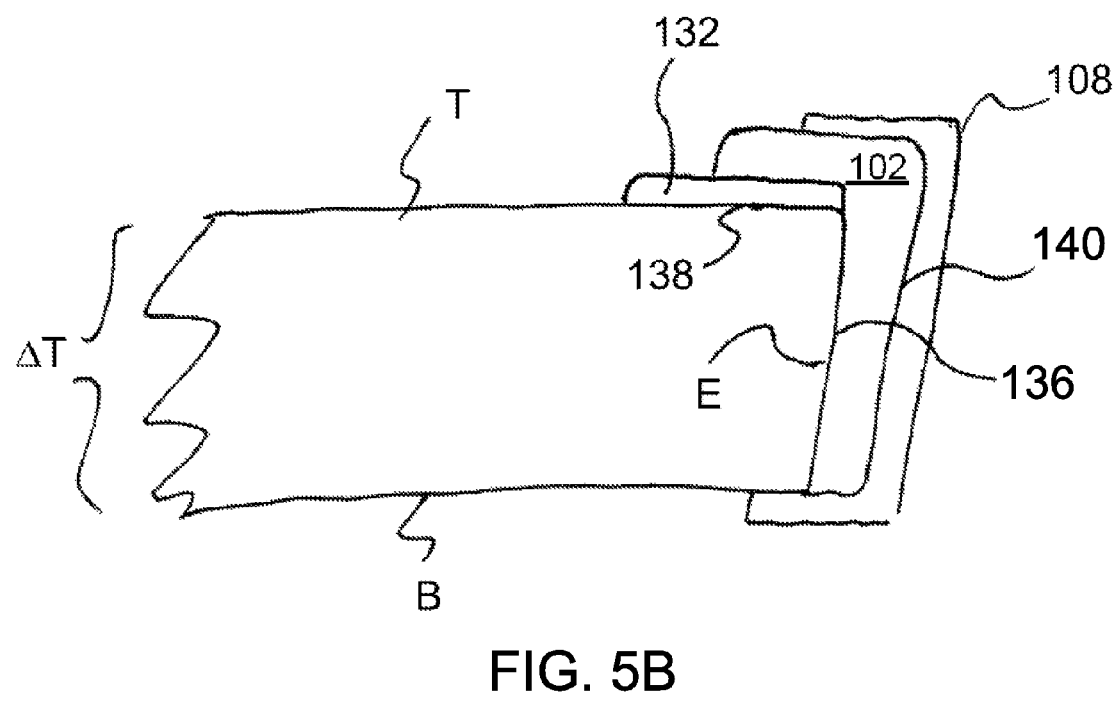

Examples of the arrangements of FIGS. 4A-4B are shown in cross-section in FIG. 5. Particularly, FIG. 5A illustrates an embodiment without a base portion 132—bottom surface 136 of members 114 and 116 defines contact surface 138, which is now in contact with top surface T of panel 112. FIG. 5B illustrates an embodiment in which contact portion 138 is defined by base portion 132, with the first, parallel, portion of bottom surface 136 of main body 102 in contact with the top side of base portion 132 as shown at 137 in FIG. 4B. Although shown as separate pieces in these examples, in some embodiments, the main body 102, extension members 114/116, and base portion 132 could be integrated into a single body.

In both FIGS. 5A-5B, the bottom surface 136 at lip portion 140 contacts an edge E of panel 112. In these examples, lip portion 140 extends the entire thickness ΔT, but in other embodiments, the lip portion need not extend the entire thickness.

In both FIGS. 5A and 5B, a cross-sectional view of attachment member 108 is also provided, showing attachment member 108 contacting the outer surface of member 102 and the bottom B of panel 112. Attachment members 108 are shown in exaggerated view in FIGS. 5A-5B.

Turning back to FIGS. 4A-4B, attachment members 108 can be seen in perspective. For instance, in this example, the outer surface 134 of second member 116 features recesses 109 so that when members 108 are used, the outer portion of attachment members 108 is flush or nearly flush with the other portions of outer surface 134. In some embodiments, both first member 114 and second member 116 feature recesses. For example, in some embodiments, members 114 and 116 may feature similar or identical structural features.

An example of using the mounting assembly noted above will now be discussed. Initially, a panel such as 112 can be provided. The panel can define a body with a top surface T opposite a bottom surface B, the top and bottom surface separated by an edge (e.g., edges 120 and 122) at the perimeter of the panel, each surface of the panel substantially parallel to the plane and the edge substantially perpendicular to the plane. Mounting assembly 102 can be positioned along an edge of the panel with contact portion 138 (as defined by a base portion 132 or the bottom of members 114/116) in contact with the topmost surface of the panel, with and the optical member receiving portion (e.g., recess 104) positioned so that an optical member positioned therein has a field of view encompassing at least some of the top surface of the panel. As noted above, the optical member can comprise at least one of an optical detector or an optical emitter.

When mounted at a corner area, first extension 114 is positioned to contact the topmost surface along a first edge (120) and second extension 116 is positioned to contact the topmost surface along a perpendicular edge (122). The lip portion 140 of each extension can act, in concert with contact portions 138 and due to the relative position of extensions 114/116, to avoid axial movement along or about the x, y, and z axes. For instance, z-axis rotation can be avoided due to lip portions 140 contacting edges 120 and 122. Z-minus translation is prevented by contact portions 138, while y-minus and x-plus translation (in this example) are prevented by lip portions 140. Contact portion 138 and lip portion 140 also prevent rotation about the x- and y-axes in one direction (counterclockwise when facing in the x+ or y+direction).

The attachment mechanism can prevent axial translational and rotational movement. For example, rotation in the clockwise direction when facing in the x+ or y+direction (labeled as R1 and R2 in FIG. 4) can be prevented, along with z-plus, y-plus, and x-minus translation (i.e. removal of the mounting assembly). Clips 108 can secure the body of mounting assembly 102 to the panel while serving to limit axial movement about both the y and x directions. Mounting features of member 114, if used, may additionally or alternatively restrict axial movement. Additionally or alternatively, clips may be used on member 114.

Other examples of attachment mechanisms include adhesives, pins, and or protrusions into and/or from panel 112 matching protrusions from and/or into mounting assembly 102. For example, in some embodiments a high-bond adhesive is placed on surface 138 to adhere the mounting assembly to the panel.

Figure 6:
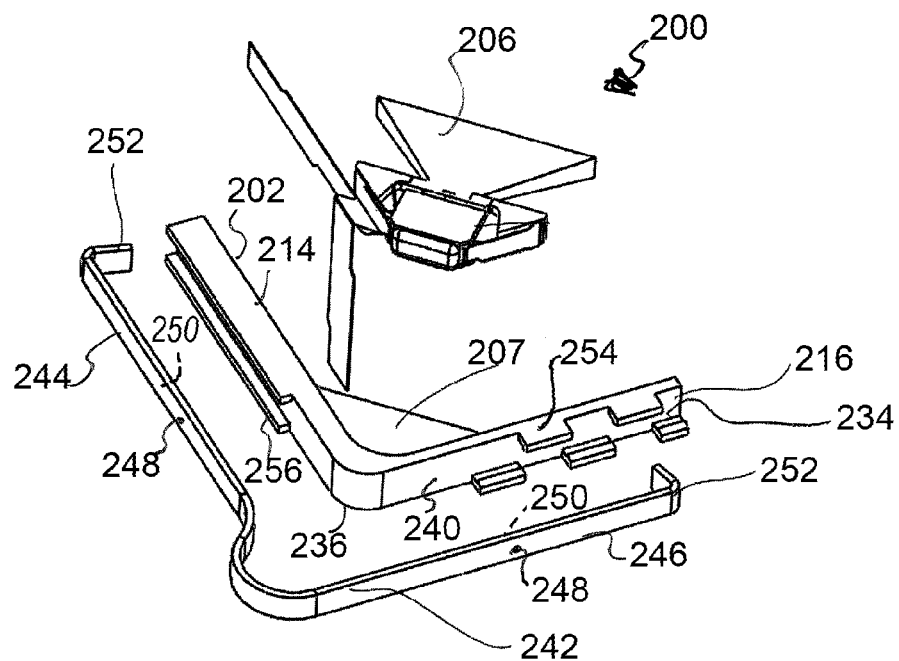
FIG. 6 is a perspective view of another embodiment of a mounting assembly.

FIG. 6 is a perspective view of another embodiment of a mounting assembly 200. In this example, the assembly features a main body 202 having a first extension member 214 and a second extension member 216, the first and second extension members substantially perpendicular to one another in a plane defined by a first axis and a second axis, the first and second extension members joined by a connecting member featuring a recess 207. As in the examples above, the recess is adapted to receive an optical component 206, in this example shown as a combination of an imaging sensor and light source.

Generally, the mounting assembly is configured similarly to that of FIGS. 4A-4B. For example, each of the first and second extension members comprises an outer surface 234 opposite a bottom or inner surface 236. The bottom surface includes a first portion substantially parallel to the plane and a lip portion 240 protruding from the bottom surface in a direction substantially perpendicular to the plane. In some embodiments, a contact surface of the mounting assembly is defined by the first portion or a base portion parallel to and in contact with the first portion. In any event, recess 207 is formed so that, when the connecting member is positioned at a corner of a panel with the contact surface in contact with a top surface of the panel, the optical component is positioned at or near the top surface of the panel, with the lip portion 240 of the first extension member 214 extending along the first axis and the lip portion 240 of the second extension member 216 extending along the second axis.

Figure 7:
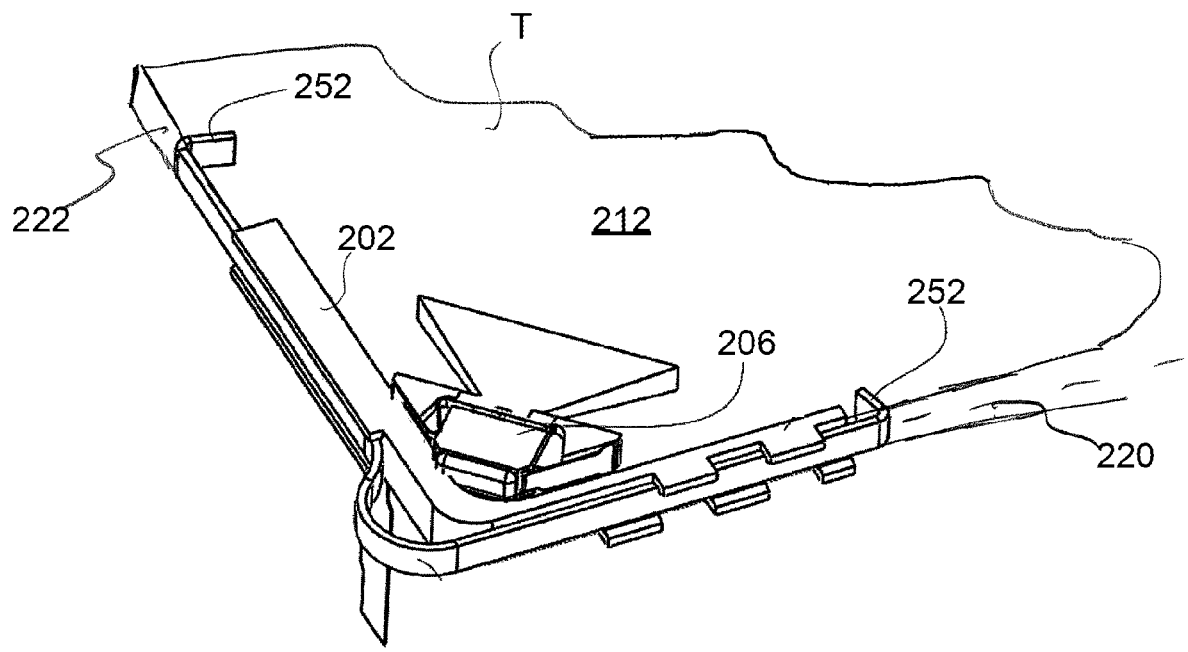
FIG. 7 is a perspective view showing the assembly of FIG. 6 mounted to a panel.

FIG. 7 is a perspective view showing the assembly of FIG. 6 mounted to a panel, and in FIG. 7 it can be seen that first portion 214 extends along edge 222 and second portion 216 extends along edge 220 of panel 212. As before, panel 212 comprises a top surface T opposite a bottom surface, the top and bottom surface separated by an edge at the edges of the panel, with each surface of the panel substantially parallel to the plane and the edges substantially perpendicular to the plane.

In this example, mounting assembly 200 further comprises a resilient assembly 242 having a first resilient member 244 and a second resilient member 246 generally perpendicular to one another in the plane. The first and second resilient members each have a body defining an exterior surface 248 and an interior surface 250, the interior surface and exterior surface each substantially perpendicular to the plane of the display. The body each of the first and second resilient members of this example further comprises a tip 252 extending perpendicular to the plane of the interior surface 250.

The main body 202 of the mounting assembly is adapted to receive the resilient assembly 242 positioned so that the interior surface 250 of each resilient member of the resilient assembly contacts the outer surface of the lip portion 240 of each extension member of the main body. In this example, outer surface 234 of body 202 features guides 254 and 256 protruding outward to receive resilient member 242, although other engagement mechanisms could be used. Additionally, in some embodiments, if lip portion 240 does not extend the entire thickness and/or does not extend along the edges as far as the resilient members 244 and 246, interior surface 250 may contact the edges of the panel.

In this example, the first and second extension members are positioned on the panel so that the optical assembly contacts the top surface of the panel at the contact portion 238, the edges of the panel at the lip portion 240, and the connecting member is positioned at or near a corner area of the panel. The resilient assembly is positioned as shown in FIG. 7 with the interior surface of each resilient member of the resilient assembly in contact with the outer surface of the lip portion of each extension member of the main body, the tip 242 of each resilient member embedded in an edge of the panel. For example, the panel may feature openings to receive tips 252 or tips 252 may simply be forced inward. In some embodiments, extension member 214 and/or 216 extends far enough along the edge of the panel to receive tip 252 and includes an opening or passage to receive tip 252.

Resilient member 242 can apply pressure inward along the edges of the panel to secure mounting assembly 200 thereto. For instance, resilient member 242 may be constructed of metal or another material and biased slightly inward (i.e. applying pressure towards the edges). Resilient member 242 may be used in addition to or instead of other attachment members, such as clips 108 of FIGS. 4A-4B. In still further embodiments, some or all of lip portion 240 can be omitted. Instead, protrusions/guides 254/256 serve to align resilient member 242 directly along the edges of the panel while also engaging resilient member 242 with body 202.

Mounting assemblies in accordance with the present subject matter may be constructed of any suitable material or materials. For example, in some embodiments, metal or metal alloys are used. As another example, plastics can be used to form at least some portions of the assembly, with metal clips used as attachment members and/or resilient members.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A mounting assembly for mounting an optical member to a panel, comprising:
    a mounting portion configured to contact a top surface of the panel when the mounting assembly is mounted to the panel;
    an optical member receiving portion comprising an opening to receive an optical member, the optical member comprising at least an optical detector, the optical member receiving portion configured to position the optical member so that a field of view of the optical detector substantially encompasses the top surface of the panel when the mounting assembly is mounted thereto;
    an attachment mechanism configured to attach the mounting portion to the panel and to limit axial movement of the mounting portion along or about an axis parallel to an edge of the panel when the mounting assembly is mounted to the panel.

2. The mounting assembly of claim 1,
    wherein the mounting portion comprises a first extension extending therefrom in a first direction and a second extension extending therefrom in a second direction, wherein the first direction and the second direction are substantially perpendicular to each other; and
    wherein the first extension contacts the top surface of the panel along a first edge and the second extension contacts the top surface of the panel along a second edge when the mounting assembly is mounted thereto.

3. The mounting assembly of claim 2, wherein the optical member receiving portion is mounted to the mounting portion substantially between the first extension and the second extension.

4. The mounting assembly of claim 1, wherein the attachment mechanism comprises a clip.

5. The mounting assembly of claim 1, wherein the mounting portion comprises a lip extending from the mounting portion in a direction that is substantially perpendicular to the top surface of the panel when the mounting assembly is mounted to the panel.

6. The mounting assembly of claim 1, wherein the optical member further comprises at least one optical emitter configured to emit energy across the top surface of the panel when the mounting assembly is mounted thereto.

7. The mounting assembly of claim 1, mounted to a panel.

8. The mounting assembly of claim 7, wherein the panel comprises:
a display device; or
an at least partially transparent material overlaid on a display device.

9. An optical member mounting assembly comprising:
a main body having a first extension member and a second extension member, the first and second extension members substantially perpendicular to one another in a plane defined by a first axis and a second axis, the first and second extension members joined by a connecting member;
a recess in the connecting member, the recess adapted to receive an optical component; and
an attachment mechanism configured to attach the mounting portion to a panel and to limit axial movement of the mounting portion along or about an axis parallel to an edge of the panel when the mounting assembly is mounted to the panel,
wherein each of the first and second extension members comprises an outer surface opposite a bottom surface, the bottom surface including a first portion substantially parallel to the plane and a lip portion protruding from the bottom surface in a direction substantially perpendicular to the plane,
wherein a contact surface of the mounting assembly is defined by the first portion or a base portion parallel to and in contact with the first portion,
wherein the recess in the connecting member is formed so that, when the connecting member is positioned at a corner of the panel with the contact surface in contact with a top surface of the panel, the optical component is positioned at or near the top surface of the panel, and
wherein the lip portion of the first extension member extends along the first axis and the lip portion of the second extension member extends along the second axis.

10. The optical member mounting assembly set forth in claim 9, further comprising:
at least one recess formed in each of the first and second extension members; and
the panel, wherein the panel has a body with a top surface opposite a bottom surface, the top and bottom surface separated by an edge at a perimeter of the panel, each surface of the panel substantially parallel to the plane and the edge substantially perpendicular to the plane,
wherein the first and second extension members are positioned on the panel so that the contact surface contacts the top of the panel and the lip portion contacts the edges of the panel, and
wherein the attachment mechanism comprises a plurality of clips and each clip is positioned in a recess of an extension member so that a first member of the clip applies pressure in a direction toward the top of the panel and a second member of the clip applies pressure in a direction toward the bottom of the panel to hold the main body in engagement with the panel.

11. The optical member mounting assembly set forth in claim 9, further comprising the panel,
wherein the panel has a body with a top surface opposite a bottom surface, the top and bottom surface separated by an edge at a perimeter of the panel, each surface of the panel substantially parallel to the plane and the edge substantially perpendicular to the plane;
wherein the first and second extension members are positioned on the panel so that the mounting assembly contacts the top surface of the panel at the contact portion, the lip portions contact respective panel edges, and the connecting member is positioned at or near a corner of the panel, and
wherein the lip portion of the first extension member limits axial movement along the second axis and the lip portion of the second extension member limits axial movement along the first axis.

12. The optical member mounting assembly set forth in claim 9, further comprising:
a resilient assembly having a first resilient member and a second resilient member perpendicular to one another in the plane, the first and second resilient members each having a body defining an interior surface and an exterior surface, the interior surface and exterior surface each substantially perpendicular to the plane;
wherein the body each of the first and second resilient members comprises a tip extending perpendicular to the body from the interior surface, and
wherein the main body is adapted to receive the resilient assembly positioned so that the interior surface of each resilient member of the resilient assembly contacts the outer surface of the lip portion of each extension member of the main body.

13. The optical member mounting assembly set forth in claim 12, further comprising the panel,
wherein the panel has a body with a top surface opposite a bottom surface, the top and bottom surface separated by an edge at a perimeter of the panel, each surface of the panel substantially parallel to the plane and the edge substantially perpendicular to the plane,
wherein the first and second extension members are positioned on the panel so that the optical assembly contacts the top surface of the panel at the contact portion, the edges of the panel at the lip portion, and the connecting member is positioned at or near a corner of the panel, and
wherein the resilient assembly is positioned with the interior surface of each resilient member of the resilient assembly in contact with the outer surface of the lip portion of each extension member of the main body, the tip of each resilient member embedded in an edge of the panel.

14. The optical member mounting assembly set forth in claim 13, wherein the panel is comprised in a display device.

* * * * *